United States Patent Office 3,081,811
Patented Mar. 19, 1963

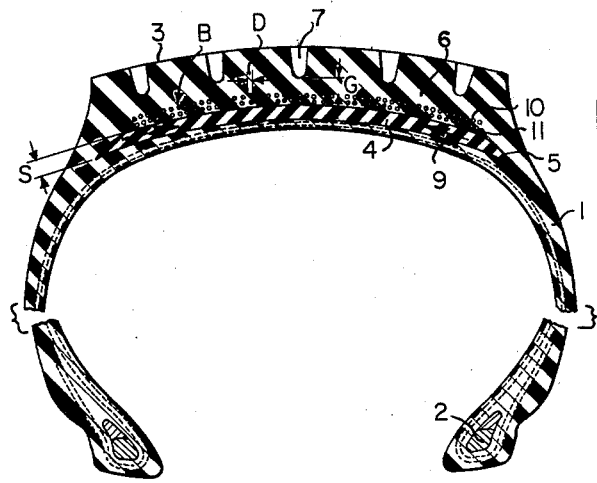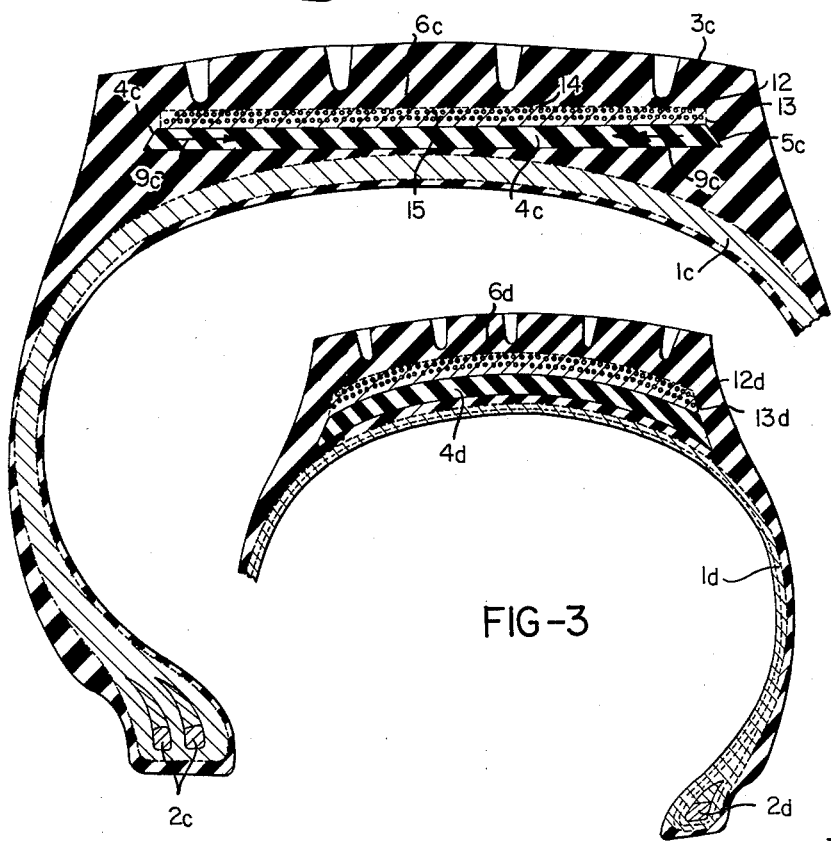

---

3,081,811
VEHICLE TIRE
Richard Beckadolph, Willfried Eckelmann, and Wilhelm Beissner, Hannover, Germany, assignors to Continental Gummi-Werke Aktiengesellschaft, Hannover, Germany
Filed Aug. 25, 1959, Ser. No. 835,993
Claims priority, application Germany Sept. 5, 1958
5 Claims. (Cl. 152—355)

The present invention relates to a vehicle tire and, more specifically, to a pneumatic vehicle tire which comprises carcass threads, bands or the like preferably located in radial planes, and which is equipped with a band of hard rubber material which is substantially co-extensive with the tread of the tire and is embedded therein.

Tires of the above mentioned general type are known in which the band is composed of two layers with metallic cords that cross each other and are embedded in rubber layers arranged closely to each other and having a hardness exceeding 72 Shore. These layers, which form an envelope, are intended to prevent a buckling of the cords as well as a shearing movement thereof with regard to each other. The hard envelope layers thus serve as auxiliary means for improving the strength of the cords and for securing the location of said cords relative to each other.

With another kind of heretofore known tires of the above mentioned type, metal wires in two layers are embedded in soft rubber mixtures while the said soft rubber mixture is envelope by hard rubber. These hard rubber envelopes, which have a thickness of more than 0.3 millimeter, are intended to reduce local tensions in the rubber during the driving operation of the tire, which tensions may be caused by the cooperation of the rubber inserts and metallic inserts.

There is a further type of heretofore known tires of the general character referred to above, according to which a soft cushioning layer is provided between the carcass and the anti-skid portion of the tire tread, that is that portion of the tread which extends to the bottom of the grooves or profile in the tread. One or more strips of yieldable rubber layers are embedded in said cushioning layer and consist of a harder mixture than the tread. While with this tire structure, local forces acting perpendicular to and upon the tread may, by means of the strips consisting of a harder rubber mixture, be distributed upon a greater surface range, it should, however, be noted that the said strips of harder rubber mixture form part of a softer cushioning layer so that they cannot absorb pressure forces acting parallel to the tread or parallel to the road.

It is, therefore, an object of the present invention to provide a pneumatic vehicle tire of the above mentioned general character, which is provided with a band adapted to absorb the lateral forces exerted upon the tire, particularly when driving through a curve, to thereby bring about a stabilization of a tire with a radial carcass.

It is also an object of the present invention to provide a pneumatic tire as set forth in the preceding paragraph, which will bring about a considerable reduction in the wear of the tire while being characterized by good driving properties and a high life.

It is another object of this invention to provide a pneumatic tire with an insert between the carcass and the tread surface, which insert will, for all practical purposes, eliminate longitudinal and transverse contractions of the tread strip at the surfaces in contact with the road.

It is a further object of this invention to provide a pneumatic vehicle tire with an insert below and substantially co-extensive with the tread surface, which will prevent the so-called growing, i.e. an undesired increase in the diameter of the tire.

These and other objects and advantages of the invention will appear more clearly from the following specification in connection with the accompanying drawings, in which:

FIG. 1 diagrammatically illustrates a radial partial section through a pneumatic vehicle tire according to the invention.

FIGS. 2 and 3 represent radial partial sections through a pneumatic vehicle tire of the invention and illustrate further modifications of the tire of FIG. 1.

GENERAL ARRANGEMENT

The present invention is based on the finding according to the invention that the wear of the tread strip will be a minimum when the tread strip during its rolling movement within the range of its road or ground-contacting surface or road or ground ellipse carries out no movements at all or no material movements relative to the road or ground. These relative movements can be eliminated only if on one hand the length of the arc of the non-deformed tread surface measured in transverse direction equals or substantially equals the width of the ground ellipse, and if on the other hand the length of the arc of the non-deformed tread surface measured in circumferential direction equals or substantially equals the length of the ground ellipse, in other words if care will be taken that the width and length of the ground ellipse will not be less than the above mentioned length of the arcs pertaining thereto.

Based on the above finding, a tire according to the present invention is characterized primarily in that the band embedded in the main body portion of the tread approximately co-extensive with the anti-skid portion consists of a band of hard rubber or rubber-like material the hardness of which is considerably greater than the hardness of the rubber or the like surrounding said band, said band preferably having a hardness in excess of 85 Shore, especially approximately from 90 to 95 Shore, while the wall thickness of said insert layer or band amounts to approximately from 0.5 to 2 times the ground rubber thickness. By "ground rubber thickness" is meant the thickness of the rubber layer provided between the above mentioned band and the anti-skid portion of the tread.

According to a further development of the invention, the hard insert or band may contain reinforcing inserts for instance in the form of textile threads or textile cord fabric or textile full fabric. It should, however, be noted that metallic reinforcing inserts in said hard band are not desired as reinforcing inserts inasmuch as they may bring about a destruction of the hard rubber.

The hard rubber band is located between the carcass and anti-skid portion of the tread and will, due to its annular shape, form a flexible but resistant belt which will be able to absorb the lateral forces occurring when driving through a curve, in other words will bring about a stabilization of a tire with a radial carcass, and due to the stiffening of the zenith portion of the tire will bring about a considerable reduction in the wear and tear of the tire. The tire according to the invention will thus excel in driving properties and have a high life span. It will be understood that the hard band according to the invention is not limited to a special carcass.

The hard band is surrounded by a layer or layers of pull-resistant threads, preferably steel strands or the like. Such layers of steel strands or the like are preferably arranged so that they are located adjacent the outer surface of said hard rubber band. These pull-resistant layers surrounding the said band, which act, so to speak, as bandages and extend over the circumference of the tire, are highly advantageous because, especially when high stressed tires are involved, they are able to absorb the pulling forces occurring in the zenith portion of the tire, whereas the pressure forces occurring in said zenith portion are absorbed by the hard band. In this way, undesired increases in the diameter will be prevented. Furthermore, the hard rubber band intended for the absorption of the pressure forces will, by means of said pull-resistant layers, be protected against undue pulling forces while the said hard rubber band will prevent pressure or buckling forces acting in longitudinal direction from harmfully affecting the layer of cords, strands or the like. The hard band thus has the essential advantage that the elements forming the same and also the elements cooperating therewith, as for instance the pull-resistant threads, strands or the like, will be subjected to those stresses only which can be safely absorbed thereby.

As mentioned above, the hard band according to the present invention has preferably a Shore hardness of above 85, however, preferably from 90 to 95. Moreover, it should be tough like leather but must not be brittle and must be able to follow the springiness of the tire. For purposes of producing this relatively hard mixture for the hard band according to the invention, it is generally suggested not to effect the hardening by increased addition of sulfur because the sulfur separates and thereby may harmfully affect adjacent rubber layers. It has proved rather advantageous to prepare the rubber mixture for the hard band by employing natural rubber and/or synthetic rubber mixtures with bright reinforcing fillers, preferably more than 25% (with regard to rubber) on a basis of aluminum oxide or silicic acid. Suitable rubber mixtures for the hard band according to the invention may also be produced by employing natural rubber or synthetic rubber mixtures with more than 50%, preferably 70% of soot (with regard to rubber). These mixtures may furthermore be produced while employing waste of bright and black reinforcing filler material for obtaining a hardness of more than 65 Shore preferably more than 85 Shore. In this connection, it may be mentioned that these hardness figures refer to such hardnesses as they are primarily obtained by the employment of fillers.

Furthermore, styrol-containing polymers with more than 25% styrol, preferably more than 40% styrol may be employed for the said hard band according to the invention. It is also possible to employ hardenable resins such as phenol formaldehyde resins in quantities of more than 10% (with regard to rubber), preferably in quantities of more than 20%. The hard band according to the invention may also be made as a band of synthetic material for instance polyvinyl chloride, polyamide, polyurethane and the like and waste material thereof and copolymers with other high polymers.

If between the hard band according to the invention and the anti-skid portion of the tread, pull-resistant layers are employed, the thickness of the hard band is so selected that the latter is at least 1.5 that of the diameter of the wire or threads in the said pull-resistant insert. Preferably, the thickness of the hard band according to the invention should be approximately from 1.5 to 4 times greater than the diameter of the wire or thickness of the layer surrounding said hard band and forming a surrounding bandage therefor.

STRUCTURAL ARRANGEMENT

Referring now to the drawings in detail, the tire shown in FIG. 1 comprises a tire carcass 1. This carcass 1 is preferably formed by threads or bands extending transverse to the circumferential direction of the tire, i.e. by such reinforcing layers which are located in at least substantially radial planes with regard to the wheel axis or main axis of the tire. The carcass threads, bands or the like are in a manner known per se anchored to the beads 2 which as usual may consist of steel wires.

Near to and above the carcass 1 there is mounted an annular relatively thick-walled hard rubber band 4 which is substantially co-extensive with the width of the anti-skid portion of the tread 3. As will be evident from FIG. 1, the said rubber band 4 has its lateral edges slanted as at 5 and has a Shore hardness A of 90. In this connection, it is important that the band 4 is embedded in the rubber of the main body portion 6 of the tread which has a Shore hardness of from 60 to 70 grades A or is embedded in or enveloped by mixtures of corresponding hardness.

The thickness S of the said hard rubber band 4 according to the invention corresponds substantially to the ground rubber thickness G which is measured from the surface of the hard rubber band 4 to the bottom of the grooves 7 of the anti-skid portion of the tread.

The hard band 4 is sufficiently resistant in order to be able to absorb pressure forces exerted upon the ground or road-contacting portion of the tire in a direction parallel to the ground or road surface, said pressure forces being indicated by the arrows 9 in FIG. 1. The thus effected stiffening brings about a lateral stabilization of the tire and greatly prevents distortions of the ground ellipse or, in other words, relative movements between the tread portion 3 and the road over which the tire rolls. Nevertheless, the said hard band according to the invention is preferably in cooperation with the radial carcass 1, sufficiently soft with regard to forces or shocks which occur in radial direction with regard to the tire or perpendicular to the ground or road surface.

The band 4 according to the present invention not only absorbs the forces acting in a direction transverse to the tire as indicated by the arrows 9 but is also sufficiently resistant against such pressure forces which act at an angle to the direction of the arrows 9, as for instance perpendicular thereto.

According to FIG. 1, the hard band 4 is enveloped by a pull-resistant annular layer or bandage B which is substantially directly adjacent to the band 4 and is likewise embedded in the rubber of the tread portion 6 or in other rubber or the like which is at least substantially as hard as the rubber of the tread.

The layer according to FIG. 1 is formed by two steel wire inserts 10 and 11 the steel wires of which extend substantially in circumferential direction of the tire. Preferably, the steel wires of the layers 10 and 11 or the threads or bands of said bandage are so arranged that they form an angle of from about 10 to 25° with the circumferential direction of the tire and do so in such a way that the steel wires of each layer are parallel to each other but that the wires of one layer cross the wires of the other layer, as illustrated in FIG. 7.

With a band 4 having associated therewith a pull-resistant annular layer, the thickness S of the layer is so selected that it will be approximately two times the diameter D of the wires or the like in layers 10 and 11.

The layers 10 and 11 arranged above the band 4 will absorb the pulling forces occurring during the operation of the tire, whereas the pressure forces are absorbed by the band 4 according to the invention as mentioned above.

When layers 10 and 11 are employed, or band 4 is surrounded by a pull resistant layer, the wall thickness S of the band 4 may be less than in the embodiments of FIGS. 1 and 2. The thickness S should in such instance be at least from 0.5 to 1.0 times the ground rubber thickness G which in conformity with FIG. 3 is measured from the surface of the layer 10 to the bottom of the grooves 7.

Referring now to FIG. 2, the tire 1c is likewise equipped with an annular relatively thick-walled hard rubber band 4c which is likewise slanted at its lateral edges 5c and is substantially co-extensive with anti-skid portion 6c of the tread. The hard rubber band 4c has a Shore hardness of approximately 95. The band 4c is surrounded by two steel wire layers 12 and 13 which comprise pull-resistant steel wires 14 extending at least approximately in the circumferential direction of the tire. Preferably, the wires 14 which are parallel to each other in each of the layers 12 and 13 extend at an angle of from 10 to 25° with regard to the circumferential direction of the tire in such a way that the wires of the layer 12 cross the wires of the layers 13. The layers 12 and 13 are enveloped by rubber 15 directly adjacent to the outer surface of the band 4c. The hardness of the rubber 15 corresponds substantially to the hardness of the tread portion 6c and amounts to approximately 65 Shore.

As will be evident from FIG. 2, the width of the layers 12 and 13 is less than the width of the band 4c, or expressed differently, the band 4c protrudes laterally beyond the layers 12 and 13. The reason for this arrangement consists in that in this way the wires 14 which convey the pulling stresses will not be able harmfully to affect the carcass 1c.

In conformity with FIG. 2, the band 4c and layers 12 and 13 extend, when looking in transverse direction, substantially straight, i.e. almost parallel to the only slightly arched tread surface of the tire, whereas the carcass 1c is considerably stronger arched within the range of its zenith portion.

While the tire according to FIG. 2 is intended primarily for larger vehicles, such as big trucks, FIG. 3 shows a tire for passenger cars. According to the tire of FIG. 3, the carcass 1d is provided with threads located substantially in radial planes with regard to the main axis of the tire. The tire according to FIG. 3 differs from that of FIG. 2 primarily in that the band 4d and the layers 12d and 13d are proportionally wider than the corresponding members 4c, 12 and 13 of FIG. 2. Furthermore, the band 4d and layers 12d and 13d follow closer the curvature of the carcass 1d.

The band 4c will absorb the pressure forces indicated by arrows 9c (FIG. 2) and extending parallel to the road. However, the band 4c will absorb not only the forces acting in the direction of the arrows 9c, but will also absorb the forces at an angle thereto, particularly at a right angle to said arrows 9c.

The thickness of the bands 4c, 4d should be a multiple of the diameter of the wires 14, 14d. More specifically, preferably thicknesses amounting to from four to six times the thickness of the wires have proved advantageous for the purpose of the present invention.

As mentioned above, it is important that the bands 4, 4c, 4d have certain definite properties. These properties will exist when employing mixtures as set forth in the following examples. In connection with these examples it should be kept in mind that the mentioned values are parts by weight.

*Example I*

| | |
|---|---|
| Natural rubber | 70.00 |
| Butadiene-styrol polymers (10% butadiene, 90% styrol) | 30.00 |
| Aging protectives | 1.00 |
| Soot | 70.00 |
| Resin | 1.00 |
| Softener | 7.00 |
| Stearine acid | 3.50 |
| Zinc white | 5.00 |
| Sulphur | 2.70 |
| Accelerator | 0.70 |
| | 190.90 |

*Example II*

| | |
|---|---|
| Acrylic nitrile-butadiene-polymers (28% acrylic nitrile) | 100.00 |
| Phenolformaldehyde resin | 25.00 |
| Aging protector | 0.50 |
| Bright reinforcing filler (on silicic acid basis) | 90.00 |
| Distributor | 1.00 |
| Softener | 15.00 |
| Viscous maker | 5.00 |
| Zinc white | 7.50 |
| Sulphur | 3.50 |
| Accelerator | 1.20 |
| | 248.70 |

It is, of course, to be understood that the present invention is, by no means, limited to the particular constructions and mixtures for the hard insert but also comprises any modifications within the scope of the appended claims.

What we claim is:

1. A pneumatic vehicle tire comprising a carcass, a tread of rubber material having a hardness of from 60 to 70 Shore providing an anti-skid portion and a main body portion, an annular band approximately the width of the anti-skid portion of the tread embedded in the main body portion between the anti-skid portion and the carcass substantially parallel to the anti-skid portion, said band being made of a rubber material having a hardness of from 85 to 95 Shore and having a thickness about from 0.5 to 2 times the distance between it and the bottom of the anti-skid portion, and a pull resistant layer embedded in the main body portion of the tread adjacent to the band between it and the anti-skid portion.

2. A pneumatic vehicle tire comprising a carcass, a tread of rubber material having a hardness of from 60 to 70 Shore providing an anti-skid portion and a main body portion, an annular rubber band having a hardness of from 85 to 95 Shore embedded in the main body portion of the tread substantially parallel to the anti-skid portion, and a pull resistant layer comprising pull resistant steel wires embedded in the main body portion of the tread adjacent the band, the thickness of the band being at least about 1.5 times the diameter of the wires.

3. A pneumatic vehicle tire comprising a carcass, a tread of rubber material having a hardness of from 60 to 70 Shore providing an anti-skid portion and a main body portion, a pull resistant annular layer embedded in the main body portion of the tread comprising a plurality of parallel thread-shaped pull resistant strength members forming at least one layer approximately the width of the anti-skid portion, and an annular band of rubber material of substantially the same width as the pull resistant annular layer and having a hardness of from 85 to 95 Shore embedded in the main body portion of the tread between the carcass and the annular layer.

4. A tire according to claim 1, in which said band comprises a rubber material with a hardenable resin in excess of 10% based on the rubber material.

5. A tire according to claim 4, in which the hardenable resin is phenol formaldehyde resin.

References Cited in the file of this patent

FOREIGN PATENTS

| 677,166 | Great Britain | Aug. 13, 1952 |
| 720,149 | Great Britain | Dec. 15, 1954 |
| 1,114,741 | France | Dec. 19, 1955 |
| 532,703 | Canada | Nov. 6, 1956 |